Jan. 2, 1951  A. GERMAIX  2,536,683
RADIO NAVIGATION SYSTEM
Filed Sept. 19, 1947

INVENTOR
Andre Germaix
By [signature]
his ATTY.

Patented Jan. 2, 1951

2,536,683

UNITED STATES PATENT OFFICE 2,536,683

RADIO NAVIGATION SYSTEM

André Germaix, Meudon, France, assignor to Compagnie pour la Fabrication des Compteurs et Materiel d'Usines a Gaz, Unis, France Application September 19, 1947, Serial No. 774,977
In France September 26, 1946

4 Claims. (Cl. 343—107)

The present invention is concerned with devices for controlling the piloting in direction and in height of moving conveyances, that make use of a cathode-ray oscillograph tube and it is related to improvements permitting to indicate to the pilot the exact amplitude of the operations to be effected in order to obtain a correct piloting in relation to the derivative of the departures disclosed by the oscillograph tube.

It is known to represent before the pilot of an aircraft the indications corresponding to the position of his machine by means of a repeater instrument constituted by a cathode-ray oscillograph tube.

In such a device, assume that the angular deviations of the aircraft are measured with respect to a datum trihedron, which is centred on the centre of gravity of the aircraft and keeps a fixed direction in space; these deviations are commonly detected by apparatus that measures the departures or differences in heading, longitudinal inclination and lateral inclination. In a device used in the invention; the heading departure results in the displacing, on the screen of the oscilloscope, of a vertical scanning trace to the right or to the left, under the action of a positive or negative voltage applied across the suitable deflecting plates of a cathode-ray tube functioning with electrostatic deflexion. The deviation or departure in lateral inclination is obtained by a rotation in one or the other direction of a scanning trace which is horizontal when the aircraft is horizontal. The rotation and production of this trace are obtained by applying alternating voltages of suitable phase and magnitude produced by the instrument detecting the lateral inclination the departure or difference in longitudinal inclination and figured by the general displacement in the vertical direction of the above-mentioned trace having a mean horizontal posititon, caused by applying a D. C. voltage across the appropriate deflection plates of the cathode-ray tube. The observation of either trace is obtained through the manipulation of a suitable switch. The pilot flies his aircraft when using this instrument, by maintaining the vertical trace at the centre of the screen and the other trace in a horizontal position passing through the centre of the screen. To this end he applies the same method as in the case when he has a gyroscopic horizon and a heading indicator of conventional types at his disposal.

The present invention is concerned with a device allowing for the execution of more complete controlling manipulations, particularly adapted to the modern methods of aerial navigation, through the observation on the repeater oscillocope of a formation identical with the above-described, the same pilot's reflexes being utilized.

The principle of the device is as follows. It is known that the steering angle to be given to the rudders or steering members of an aircraft in order to compensate for a departure in longitudinal inclination or in direction is necessarily proportional to a linear combination of the departure and of its derivative. According to the present invention, the voltage applied to the deflecting plates of the oscillograph tube, which voltage is normally proportional to the departure, is combined with an additional voltage proportional to the derivative of the departure. By giving to the rudders of the aircraft a steering angle having a value proportional to the displacement of the trace on the screen of the oscillograph tube, the pilot will therefore execute an operation aiming at compensating integrally for the effects of the departure undergone by the aircraft.

The device according to the invention comprises in combination with a flight control oscilloscope, an electric differentiating device to which is applied a voltage proportional to the extent of the departures, and the output voltage of which is electrically combined with the departure voltage, so as to deliver at the plates of the oscillograph tube, a deflecting voltage proportional to the steering angle which is to be given to the rudders for the compensation of the departures.

The device which is the object of the invention is explained in the following description in connection with the accompanying drawings in which.

Figure 1:
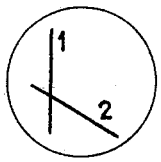
Fig. 1 shows the outside appearance of the screen of an oscilloscope on which is obtained an oscillogram corresponding to an aircraft with the tail down, laterally inclined to the left and heading on the right of the direction to be maintained.

Referring to Fig. 1, the trace 1 is controlled by the departure in heading that results in a D. C. voltage being applied across vertical plates of the oscilloscope in the position of the switching device, corresponding to the vertical scanning that permits the formation of this trace.

The trace 2 is obtained in the other position of the switching device through a known method which consists namely in combining the action of two alternating potentials the proportion of which is regulated by the detector of lateral inclination departure. The position of the trace 2 as regards height is controlled by a D. C. voltage from the indicator of longitudinal inclination difference, applied across horizontal plates of the oscilloscope.

Figure 2:
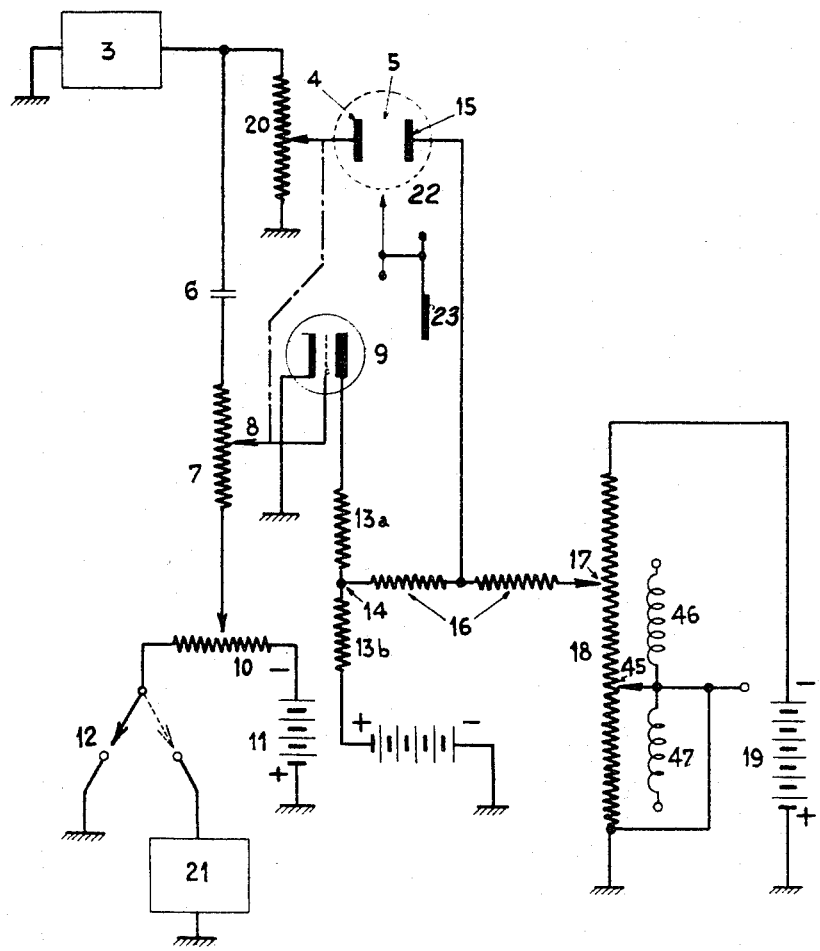
Fig. 2 shows by way of example an embodiment according to the invention.

In order to simplify the exposition, the following description which is relative to Figure 2 is made, while supposing that the device which is the object of the invention is applied for the correction of the indications of departures in direction. The same device, working in the same manner, is adapted to correct the indications of differences in longitudinal inclination.

In Figure 2, a detecting element 3 arranged in connection with a heading indicator, delivers to the plate 4 of the oscilloscope 5 a voltage that is proportional to the departure of the heading of the airplane from a pre-determined direction. The capacitor 6 constitutes in conjunction with the resistant potentiometer 7 a differentiating circuit. The voltage taken off by the cursor 8 and applied to the grid of the tube 9 is thus proportional to the derivative of the heading departure. This grid is biassed by the voltage divider 10 supplied with direct current for instance by the source 11 and grounded through the switch 12. The load resistor 13$^a$, 13$^b$ in the plate of the tube 9 includes an intermediate tapping 14. The potential of the plate 15 of the oscilloscope is taken off on a voltage divider interposed between the tapping 14 and the cursor 17 of a potentiometer 18 supplied with direct current for instance by a source 19 and connected between the negative pole of the latter and ground. The tension of the plate 4 of the oscilloscope is adjusted by a potentiometer 20, the cursor of which may be twin-ganged with that of potentiometer 7.

The potential of the plate of the tube 9 follows the variations of the grid potential. These variations are consequently proportional to the derivative of the heading departures. The situation of the cursor 8 permits of varying the factor of proportionality. The bias of tube 9 is adjusted through the cursor of the voltage divider 10; when this bias is being varied, the mean potential of plate 15 changes. The same result is obtained by displacing the cursor 17. Those two adjustments are so chosen that the potential of plate 15 will be zero for a fixed heading departure. When this heading departure varies, the potential of plate 15 will change proportionally to its derivative. The trace 1 of the tube moves under the conjugate influence of the potentials of the two plates. Its displacement will thus be proportional to a linear combination of the heading departure and of its derivative. Now, it is well known that the steering angle of the rudder, intended for balancing out a given heading departure must be proportional to a linear combination of the departure and of its derivative. Through a judicious adjustment of the potentiometers 20 and 7 which define the coefficients of the linear combination, it will then be possible to obtain on the screen of the oscilloscope, a displacement of the trace 1 which is proportional to the steering angle that must be given to the rudder. If an index 22 mechanically connected to the rudder 23 moves before the dial of the oscilloscope along a horizontal diameter with a suitable step-down link, the pilot will have but to maintain coincidence between the index and the trace to ensure a correct pilotage.

In Figure 2, the switch 12 may connect the end of potentiometer 10 either to ground, or to the outlet of a radio-beacon receiver 21. The combination of a radio-beacon receiver with a flight control oscilloscope is the object of my co-pending application No. 774,978, now abandoned. The simultaneous utilization of the device which is the object of the present invention and of the device described in the above cited application permits of correcting the indications of the oscilloscope both in relation to the derivative of the departures in direction and in relation to the bearing of the aircraft with respect to the axis of the radio-beacon.

In my co-pending application No. 774,976, there is described an unit that permits of correcting the indications given by the flight control oscilloscope in relation to the difference between the altitude of the moving conveyance and a pre-determined altitude. The present invention provides the combination with the same oscilloscope of the unit which is the object of the present application and of one or both units described in the two above-cited applications.

The invention is not limited to moving conveyances; it is further susceptible of being applied to any mechanical device in which a moving element either in rotation or in translation is to be maintained on a pre-determined direction by means of an actuating member that controls its speed which is either linear or angular.

The device which is the object of the above description is given only by way of example in order to set forth the characteristic features of the invention.

In particular, any electric system for differentiating which differs from the one described can be employed without departing from the scope of the invention, with the purpose to form the combination of the departure and of its derivative.

Having now particularly described and ascertained the nature of my said invention and in what manner the same is to be performed, I declare that what I claim is:

1. In combination with a piloting indicator of a moving conveyance, which indicator comprises a detector of departures of the longitudinal conveyance axis in one of the horizontal and vertical planes containing the direction to be followed by the said conveyance and a cathode-ray oscillograph tube having one deflecting plate connected to the departure detector, an electric differentiating device to which is applied the voltage given by the departure detector, means for adding in the circuit of the deflecting plates of the oscillograph tube, to the voltage given by the departure detector the output voltage of the said electric differentiating device.

2. In combination with a piloting indicator of a moving conveyance, which indicator comprises a detector of departures of the longitudinal conveyance axis in one of the horizontal and vertical planes containing the direction to be followed by the said conveyance and a cathode-ray oscillograph tube having one deflecting plate connected to the departure detector, an electric differentiating device to which is applied the voltage given by the departure detector, an electronic tube having its grid connected to the said electric differentiating device, a voltage divider, having one extremity thereof connected to the plate circuit of the said electronic tube, and an intermediate point thereof connected to one of the deviation plates of the oscillograph tube and means to apply to the other extremity of said voltage divider a direct current potential predeterminedly adjustable.

3. In combination with a piloting indicator of a moving conveyance, which indicator comprises a detector of departures of the longitudinal conveyance axis in one of the horizontal and vertical planes containing the direction to be followed by the said conveyance and a cathode-ray oscillograph tube having one deflecting plate connected to the departure detector, a capacitor having one armature thereof connected to the departure detector, a potentiometer of the type employing a cursor, having one extremity connected to the other armature of the said capacitor and means to raise the other extremity of said potentiometer to a D. C. potential predeterminedly adjustable, an electronic tube having its grid connected to said cursor of the said potentiometer, and means for connecting the plate circuit of the said electronic tube to the circuit of the deflecting plates of the said oscillograph tube.

4. In combination with a piloting indicator of a moving conveyance, which indicator comprises a detector of departures of longitudinal conveyance axis in one of the horizontal and vertical planes containing the direction to be followed by the said conveyance and a cathode-ray oscillograph tube having one deflecting plate connected to the departure detector, an electric differentiating device to which is applied the voltage given by the departure detector, a radio-beacon receiver and means for adding in the circuit of the deflecting plates of the oscillograph tube, to the voltage delivered by the departure detector, a voltage proportional to the sum of the output voltage of the said electric differentiating device and of the output voltage of the radio-beacon receiver.

ANDRÉ GERMAIX.

REFERENCES CITED

The following references are of record in the file of this patent:

UNITED STATES PATENTS

| Number | Name | Date |
|---|---|---|
| 2,201,174 | Harding et al. | May 21, 1940 |
| 2,423,337 | Moseley | July 1, 1947 |

FOREIGN PATENTS

| Number | Country | Date |
|---|---|---|
| 516,567 | Great Britain | Jan. 5, 1940 |